United States Patent
Holbein et al.

(10) Patent No.: US 12,296,786 B2
(45) Date of Patent: May 13, 2025

(54) SEATBELT SYSTEM AND METHOD FOR DETERMINING THE EXTENSION LENGTH OF A SEATBELT SYSTEM BELT STRAP WHICH IS WOUND ON A ROTATABLE BELT COIL

(71) Applicant: ZF AUTOMOTIVE GERMANY GMBH, Alfdorf (DE)

(72) Inventors: Wolfgang Holbein, Alfdorf (DE); Frederic Michel, Schwäbisch Gmünd (DE); Patrizia Lang, Waldstetten (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 268 days.

(21) Appl. No.: 17/916,092

(22) PCT Filed: Mar. 30, 2021

(86) PCT No.: PCT/EP2021/058233
§ 371 (c)(1),
(2) Date: Sep. 30, 2022

(87) PCT Pub. No.: WO2021/198219
PCT Pub. Date: Oct. 7, 2021

(65) Prior Publication Data
US 2023/0158996 A1 May 25, 2023

(30) Foreign Application Priority Data
Apr. 1, 2020 (DE) ...................... 10 2020 109 041.2

(51) Int. Cl.
*B60R 22/48* (2006.01)
*B60R 22/34* (2006.01)

(52) U.S. Cl.
CPC .............. *B60R 22/48* (2013.01); *B60R 22/34* (2013.01); *B60R 2022/4816* (2013.01); *B60R 2022/4825* (2013.01)

(58) Field of Classification Search
CPC .. B60R 22/34; B60R 22/48; B60R 2022/4825
See application file for complete search history.

(56) References Cited

U.S. PATENT DOCUMENTS

| | | | |
|---|---|---|---|
| 6,290,160 B1 * | 9/2001 | Strobel | B60R 22/34 242/383 |
| 7,891,596 B2 * | 2/2011 | Holbein | B60R 22/46 242/382.4 |
| 9,333,941 B2 * | 5/2016 | Ikeda | B60R 22/34 |

FOREIGN PATENT DOCUMENTS

| | | |
|---|---|---|
| DE | 102007017375 A1 | 10/2008 |
| DE | 102015007555 A1 | 12/2016 |

(Continued)

OTHER PUBLICATIONS

PCT International Search Report for corresponding International Application Serial No. PCT/EP2021/058233, mailed Jun. 18, 2021, pp. 1-6.

*Primary Examiner* — Sang K Kim
(74) *Attorney, Agent, or Firm* — Tarolli, Sundheim, Covell & Tummino LLP

(57) ABSTRACT

A seat belt system (10) has a control unit (14) and a seat belt (16) which includes a webbing (18) and a belt retractor (20). The belt retractor (20) comprises a belt reel (28) for the webbing (18), a rotation angle sensor (30) with a sensor unit and a rotatable measuring element, and a gear unit coupling the belt reel (28) to the measuring element. The belt reel (28) has a fully extended position and a ghost position. Furthermore, the gear unit is designed so that the gear unit reduces the rotation of the belt reel (28), when the belt reel (28) is adjusted from the ghost position to the fully extended (Continued)

position, to a maximum of 1.0 revolutions of the measuring element. In addition, a method for determining the extension length of a webbing (18) of a seat belt system (10) wound on a rotatable belt reel (28) is provided.

17 Claims, 2 Drawing Sheets

(56) References Cited

FOREIGN PATENT DOCUMENTS

| | | |
|---|---|---|
| DE | 102015007557 A1 | 12/2016 |
| DE | 102017122459 A1 | 3/2019 |
| WO | 2019/233911 A1 | 12/2019 |

\* cited by examiner

SEATBELT SYSTEM AND METHOD FOR DETERMINING THE EXTENSION LENGTH OF A SEATBELT SYSTEM BELT STRAP WHICH IS WOUND ON A ROTATABLE BELT COIL

RELATED APPLICATIONS

This application is a U.S. National Stage Application filed under 35 USC 371, claiming priority to Serial No. PCT/EP2021/058233, filed on 30 Mar. 2021; which claims priority from German Patent Application DE 10 2020 109 041.2, filed 1 Apr. 2020, the entireties of which are hereby incorporated herein by reference.

TECHNICAL FIELD

The invention relates to a seat belt system, in particular for a vehicle seat, comprising a control unit and a seat belt which includes a webbing and a belt retractor, wherein the belt retractor includes a belt reel for the webbing, a rotation angle sensor with a sensor unit and a rotatable measuring element, and a gear unit coupling the belt reel to the measuring element and comprising at least one gear element. Moreover, the invention relates to a method for determining the extension length of a webbing of a seat belt system wound on a rotatable belt reel.

BACKGROUND

Various systems for determining the webbing extension length are known in seat belt systems comprising belt retractors. The determination of the webbing extension length is usually based on the detection of the rotational position of the belt reel onto which the webbing is wound. In order to be able to determine the absolute angle of rotation of the belt reel which, based on a zero position, may be more than 360° when the belt reel has performed more than one revolution, it is necessary that, apart from the angular position of the belt reel, also the number of revolutions of the belt reel in both directions of rotation can be detected.

If the angle of rotation of the belt reel is detected by an incrementally or semi-absolutely detecting measuring device in which only part of the entirety of the reel revolutions is detected, such as the range of a revolution from 0° to 360°, and is then summed up and, resp., incremented, the absolute value of the angle of rotation of the belt reel relative to a fixed reference point, specifically a zero point, is unknown. Moreover, after turning off and restarting the detecting control device, the previous position information is lost.

It is basically possible, when using such an incrementally and, resp., semi-absolutely detecting measuring device, to provide at least one reference point which can be referred to when the incrementally and, resp., semi-absolutely detected angle of rotation of the belt reel is identified. The absolute angle of rotation of the belt reel then can be determined via the entirety of the belt reel revolutions. It is the drawback of such reference point that the detected angle of rotation of the belt reel is not absolutely known until the reference point is identified.

SUMMARY

It is the object of the invention to determine as precisely as possible the current webbing extension length in a seat belt system comprising a belt retractor by simple means, i.e., with little effort in terms of devices.

This object is achieved by a seat belt system, in particular for a vehicle seat, comprising a control unit and a seat belt that includes a webbing and a belt retractor. The belt retractor has a belt reel for the webbing, a rotation angle sensor with a sensor unit and a rotatable measuring element, and a gear unit coupling the belt reel to the measuring element and comprising at least one gear element. The belt reel has a fully extended position, i.e., an angular position of the belt reel corresponding to the largest possible webbing extension, and a ghost position, i.e., an angular position of the belt reel corresponding to the smallest possible webbing extension when the belt buckle is closed, i.e., when the seat belt is fastened. Accordingly, the gear unit is designed so that the gear unit reduces the rotation of the belt reel, when the belt reel is adjusted from the ghost position to the fully extended position, to a maximum of 1.0 revolutions of the measuring element. Thus, via the angular position of the measuring element, i.e., the angle of rotation vis-à-vis a reference position, the absolute webbing extension can be determined in the range between the fully extended position and the ghost position, as in this range an extension length of the webbing is associated one-to-one with each angular position of the measuring element. This means in particular that in this range the belt reel revolutions are not detected incrementally. As compared to a system in which the whole belt reel revolutions, i.e., the range from the fully extended position to the minimally extended position, are reduced to one revolution and are measured, the lower reduction shows a higher accuracy.

In accordance with the invention, the minimum extension position is an angular position of the belt reel that corresponds to the smallest possible webbing extension when the belt buckle is not closed.

As a matter of course, the seat belt system can include, in a known way, a locking tongue on the webbing and a belt buckle fixed to the vehicle.

In order to further increase the accuracy with which the webbing extension can be determined in the range between the fully extended position and the ghost position, in one embodiment the gear unit is intended to reduce the rotation of the belt reel, when the belt reel is adjusted from the ghost position to the fully extended position, to more than 0.9, in particular more than 0.95 revolutions of the measuring element. In this way, a particularly large angular range is available to which the webbing extension can be mapped in this range.

In one embodiment, the gear element is the measuring element, thus allowing the belt retractor to have a particularly compact design.

As an alternative to this, in another embodiment the measuring element can be secured, in particular directly, to the gear element. This may result in advantages during manufacture. In addition, or as an alternative, the measuring element and/or the gear element can be specifically designed corresponding to their function, in particular without requiring any compromises as to design, as they may be necessary for an element that combines the functions of the measuring element and the gear element in itself.

The measuring element can be secured particularly to the last gear element so that the reduction between the belt reel and the measuring element is maximum. The last gear element is the gear element opposite to the input gear element in the chain of action, specifically the output gear element of the gear unit.

In another embodiment, the belt reel has a minimum extension position, i.e., an angular position of the belt reel which corresponds to the smallest possible webbing extension when the belt buckle is not closed. The gear unit is designed so that the gear unit reduces the rotation of the belt reel, when the belt reel is adjusted from the minimum position to the fully extended position, to more than 1.0 revolutions and less than 2.0 revolutions of the measuring element. Thus, also the range between the ghost position and the minimum position can be mapped to a maximum of one revolution of the measuring element, thus allowing to increase the accuracy with which the webbing extension in this range can be measured.

In order to ensure particularly high measuring accuracy, it is advantageous when the gear unit reduces the rotation of the belt reel, when the belt reel is adjusted from the minimum position to the fully extended position, to more than 1.05, in particular more than 1.10 revolutions of the measuring element. In this way, an appropriately large angular range is available onto which the webbing extension in this range can be mapped.

In addition, or as an alternative, in another embodiment the gear unit can be provided to reduce the rotation of the belt reel, when the belt reel is adjusted from the minimum position to the fully extended position, to less than 1.5 revolutions of the measuring element. Since the webbing extension between the minimum position and the ghost position usually amounts to less than half the webbing extension between the ghost position and the fully extended position, in this way a particularly high accuracy can be ensured by means of a linear reduction. Further, a gear unit having a linear reduction is particularly cost-efficient.

The rotation angle sensor may be a magnetic sensor, an optical sensor and/or an induction-based sensor. Said sensors excel by high reliability and measuring accuracy and, furthermore, are cost-efficient and low-wear.

According to one embodiment, the gear unit is a single-stage gear unit, thus allowing it to have a particularly simple structure and compact design.

As an alternative, in another embodiment the gear unit may be a multi-stage gear unit, allowing it to be adapted excellently to various requirements. In particular, specific gear ratios can be provided more precisely, in a more compact and/or more cost-efficient manner using a multi-stage gear unit.

According to another embodiment, the seat belt system has a belt buckle and a locking tongue coupled to the webbing for the belt buckle which in the closed state is coupled to the webbing via the locking tongue. In particular, the belt buckle includes a belt buckle sensor which is arranged to determine whether the belt buckle is closed, i.e., the locking tongue is engaged with the belt buckle, or is opened. In this way, the state of the belt buckle can be used as a parameter for determining the webbing extension. In particular, a closed belt buckle means that the webbing extension is in the range between the ghost position and the fully extended position so that this range can be reliably delimited against the range between the minimum position and the ghost position.

In accordance with the invention, for achieving the above-mentioned object also a method for determining the extension length of a webbing of a seat belt system wound on a rotatable belt reel is provided, the belt reel having a fully extended position and a ghost position. Here the following steps are carried out: detecting whether a locking tongue of the seat belt system is inserted in the belt buckle of the seat belt system, measuring, when the locking tongue is inserted in the belt buckle, the angular position of a measuring element that is coupled to the belt reel by means of a gear unit, wherein the rotation of the belt reel is reduced, when the belt reel is adjusted from the ghost position to the fully extended position, to a maximum of 1.0 revolutions of the measuring element by the gear unit, and determining the extension length of the webbing based on the measured angular position.

The invention is based on the finding that the absolute webbing extension in the range between the ghost position and the fully extended position can be detected very precisely with little effort in terms of devices by determining the angular position of a measuring element, wherein an extension length of the webbing is associated one-to-one with each angular position in this range by means of the gear unit.

The information that the belt buckle is closed, i.e., the locking tongue is inserted in the belt buckle and engages with the latter, is also considered for determining the extension length to ensure that the webbing extension is in the range between the ghost position and the fully extended position.

The advantages and features which are illustrated concerning the seat belt system are equally applicable to the method, and vice versa.

In one embodiment of the method, the rotation of the belt reel is reduced, when the belt reel is adjusted from the ghost position to the fully extended position, to more than 0.9, specifically more than 0.95 revolutions of the measuring element. This increases the accuracy with which the absolute webbing extension between the ghost position and the fully extended position can be determined, as the extension length of the webbing in this range is mapped onto a particularly large angular range of the measuring element.

BRIEF DESCRIPTION OF THE DRAWINGS

Further advantages and features will be evident from the following description and from the attached drawings, wherein.

DESCRIPTION

Figure 1:
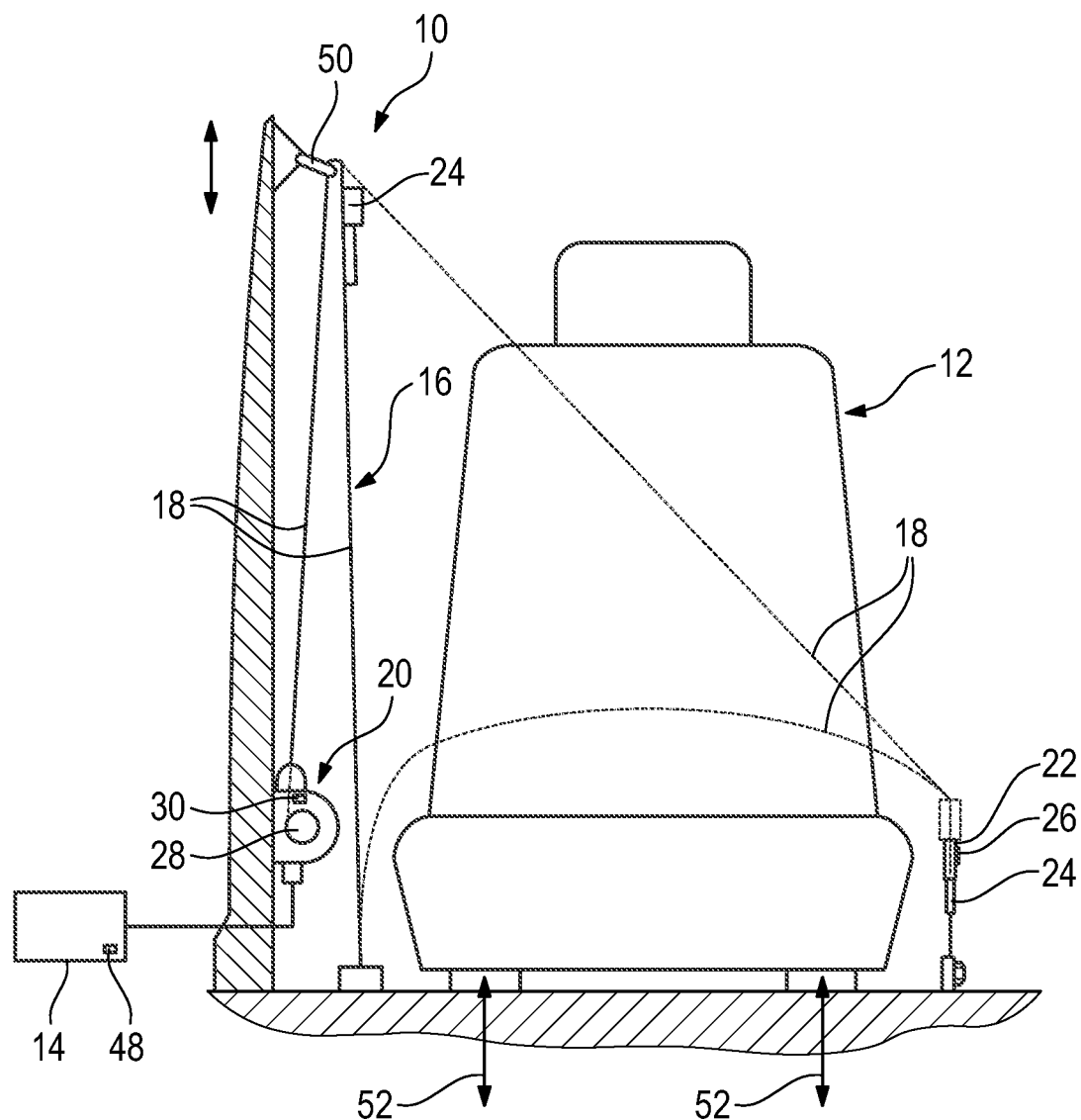
FIG. 1 shows, in a schematic view, a seat belt system according to the invention which includes a belt retractor comprising a gear unit and a rotation angle sensor.

FIG. 1 illustrates a seat belt system 10 that is intended to be used for buckling up and, thus, securing a person or an object in a seat 12 associated with the seat belt system 10.

In the shown embodiment, the seat 12 is a vehicle seat. Basically, the seat 12 can be any seat, however.

Further, the seat belt system 10 is not limited to the use in combination with a seat 12, but can be provided for any devices in which an object is intended to be secured by the seat belt of the seat belt system 10.

The seat belt system 10 comprises a control unit 14, a seat belt 16 with a webbing 18 and a belt retractor 20 for the webbing 18, a belt buckle 22 as well as a locking tongue 24 coupled to the webbing 18.

The control unit 14 may be part of the belt retractor 20, a separate unit in the vehicle or part of a vehicle onboard computer.

The belt buckle 22 is arranged for the locking tongue 24 engaging with the belt buckle 22, when the locking tongue 24 is inserted into the belt buckle 22. In this way, the belt buckle 22 is closed and the locking tongue 24 is securely fastened on the belt buckle 22.

By pressing onto an unlocking mechanism (not shown), such as a press-button on the belt buckle 22, the belt buckle 22 is unlocked and the locking tongue 24 is released.

The belt buckle 22 further includes a belt buckle sensor 26 that is connected to the control unit 14 for signal transmission and is arranged to identify the belt buckle status, i.e., whether or not the belt buckle 22 is in the closed state.

The belt retractor 20 comprises a belt reel 28 which is intended for providing, i.e., for winding and unwinding, the webbing 18, a rotation angle sensor 30 with a sensor unit 32 (see FIG. 2) and a measuring element 34, as well as a gear unit 36.

The belt reel 28 is rotatably supported about the axis of rotation R (see FIG. 2) in a frame 38 of the belt retractor 20.

In order to ensure that the webbing 18 is always tightly tensioned, the belt retractor 20 includes a belt tensioning unit (not shown) which is generally known from prior art, such as in the form of a spring mechanism and/or an electrically driven belt tensioner.

The belt buckle status informs about whether the locking tongue 24 of the seat belt 16 is inserted in the dedicated belt buckle 22. If this is the case, it can mean two things: Either a certain length of webbing 18 was extended to buckle up a vehicle occupant, a child seat or any other object in the associated seat 12 (in FIG. 1 the path of the webbing 18 is shown in dashed lines for this case); or the webbing 18 is extended only minimally so that, although the locking tongue 24 is inserted into the belt buckle 22, no person or object was buckled up in the associated seat 12. In this case, the webbing 18 extends closely to the seat 12 and rests against the seat 12 at least at one point. The absolute angle of rotation of the belt reel 28 corresponding to this minimum extension of the webbing 18, when the locking tongue 24 is inserted in the belt buckle 22, is referred to as ghost position.

Further, the absolute angle of rotation of the belt reel 28 that corresponds to a maximum extension of the webbing 18 is referred to as fully extended position, and the absolute angle of rotation of the belt reel 28 that corresponds to a minimum extension of the webbing 18, when the locking tongue 24 is not inserted, is referred to as minimum position.

Figure 2:
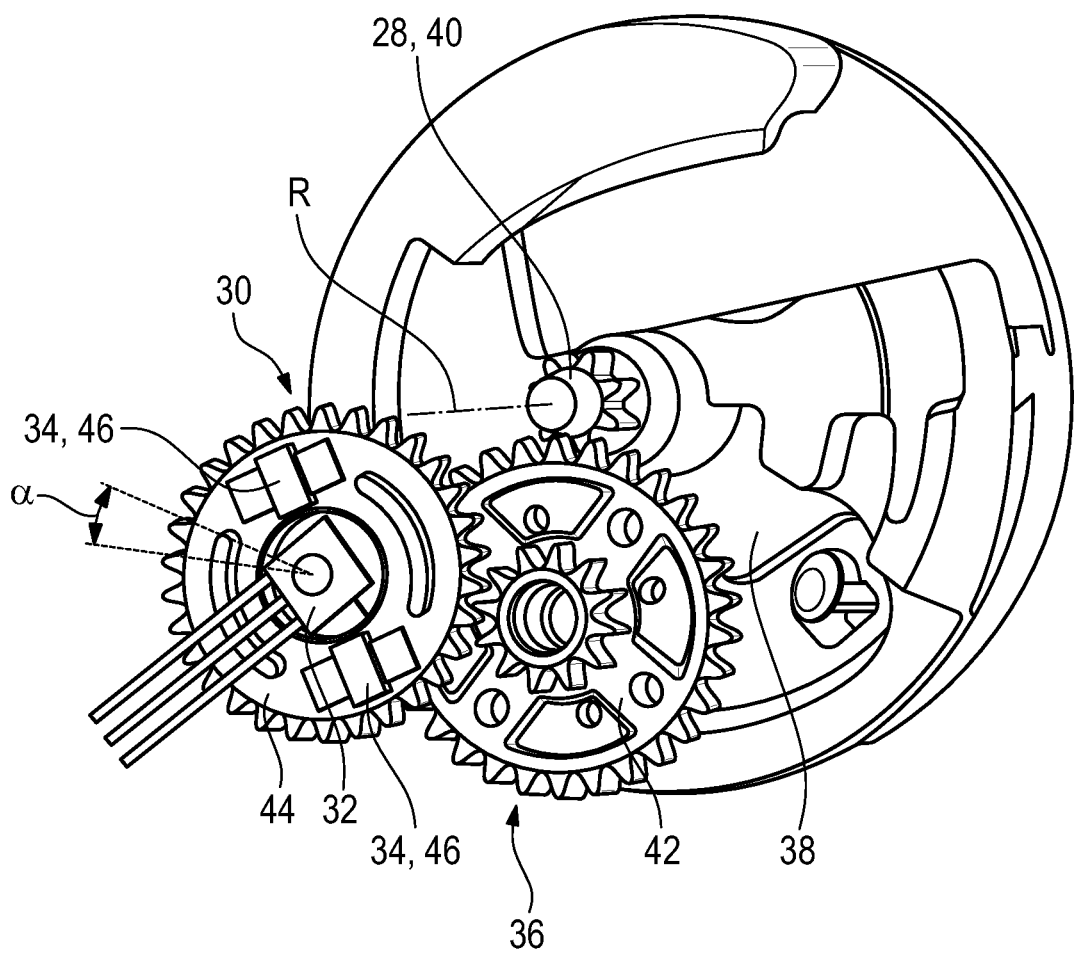
FIG. 2 shows, in a schematic detail view, the gear unit and the rotation angle sensor of the belt retractor according to FIG. 1.

Based on FIG. 2, the structure of the gear unit 36 of the belt retractor 20 shall be illustrated as follows.

In the shown embodiment, the gear unit 36 is a two-stage spur gear system comprising a pinion 40, a first gear element 42 in the form of a first gearwheel and a second gear element 44 in the form of a second gearwheel, the pinion 40 being coupled to the second gear element 44 via the first gear element 42.

The second gear element 44 is the last gear element in the chain of action of the gear unit 36, with the pinion 40 forming the input gear element.

As a matter of course, the gear unit 36 can be, in an alternative embodiment, a single-stage gear unit or a multi-stage gear unit having any number of gear stages.

Also, the gear unit 36 is not limited to a, particularly pure, gear drive.

Furthermore, instead of a pinion 40, any input gear element may be provided to input the rotation of the belt reel 28 into the gear unit 36, that is, to couple the belt reel 28 to the gear unit 36.

The pinion 40 is aligned coaxially with the axis of rotation R and is coupled to the belt reel 28 in a rotationally fixed manner so that rotation of the belt reel 28 about the axis of rotation R is transmitted 1:1 into the pinion 40.

The gear unit 36 has a transmission ratio so that the second gear element 44 rotates about an angle of rotation a of 350°, when the belt reel 28 is adjusted from the ghost position to the fully extended position.

In an alternative embodiment, the gear unit 36 may have a different transmission ratio on the precondition that the second gear element 44 rotates about an angle of rotation a of a maximum of 360°, when the belt reel 28 is adjusted from the ghost position to the fully extended position. This means that the rotation of the belt reel 28 is reduced to a maximum of 1.0 revolutions of the second gear element 44, when the belt reel 28 is adjusted from the ghost position to the fully extended position.

For example, the gear unit 36 exhibits such a transmission ratio that the second gear element 44 rotates about an angle of rotation a of at least 324°, specifically of at least 342°, when the belt reel 28 is adjusted from the ghost position to the fully extended position.

Moreover, the extendible webbing length of the webbing 18 is such that the second gear element 44 rotates about an angle of rotation a of 500°, when the belt reel 28 is adjusted from the minimum position to the fully extended position.

The second gear element 44 can basically rotate about any angle of rotation a, when the belt reel 28 is adjusted from the minimum position to the fully extended position.

Preferably, the second gear element 44 rotates about an angle of rotation a of less than 540°, when the belt reel 28 is adjusted from the minimum position to the fully extended position.

In addition, or as an alternative, the second gear element 44 can rotate about an angle of rotation a of more than 378°, specifically of more than 396°, when the belt reel 28 is adjusted from the minimum position to the fully extended position.

For example, the gear unit 36 has a transmission ratio so that the second gear element 44 rotates about an angle of rotation a of more than 360° and less than 720°, when the belt reel 28 is adjusted from the minimum position to the fully extended position.

In the shown embodiment, the rotation angle sensor 30 is a magnetic sensor.

The measuring element 34 is constituted by two magnetic rotary encoders 46 which are secured to the second gear element 44.

The rotation angle sensor 30 is arranged to identify the angular position of the measuring element 34 and, thus, the angle of rotation a of the second gear element 44 by means of the sensor unit 32 and the rotary encoders 46.

Rotation angle sensors 30 of this type are sufficiently known so that the structure and functioning thereof shall not be further discussed here.

As a matter of course, the rotation angle sensor 30 may have any design, in particular with any number of rotary encoders 46.

In addition, or as an alternative, in another alternative embodiment the rotation angle sensor 30 can be any sensor for determining the angle of rotation, such as an optical rotation angle sensor or an induction-based rotation angle sensor.

It is also imaginable that the measuring element 34 is part of a gear element 42, 44, specifically of the second gear element 44, or is identical thereto.

The rotation angle sensor 30 is connected to the control unit 14 via the sensor unit 32 for signal transmission.

The control unit 14 comprises a storage unit 48 in which an absolute value is stored for the webbing length that is extended from the belt reel 28 to adjust the belt reel 28 from the ghost position to the fully extended position. Hereinafter this value is referred to as nominal value.

Furthermore, in the storage unit 48 a value is stored for the webbing length that is extended from the belt reel 28 to adjust the belt reel 28 from the minimum position to the ghost position. Hereinafter, this value is referred to as minimum value.

The maximum extendible webbing length, i.e., the webbing length that is extended from the belt reel 28 to adjust the belt reel 28 from the minimum position to the fully extended position, thus corresponds to the sum of the minimum value and the nominal value.

The control unit 14 is arranged to carry out the following method for determining the current extension length of the webbing 18.

For determining the current webbing extension, i.e., the current extension length of the webbing 18, in one step the belt buckle status is identified by means of the belt buckle sensor 26.

Moreover, in a further step, the absolute angle of rotation a of the second gear element 44 is identified by means of the rotation angle sensor 30.

As a reference position to identify the absolute angle of rotation a, for example the angular position of the second gear element 44 in the fully extended position of the belt reel 18 is taken into consideration, as said position is always the same, irrespective of external factors such as the seat position.

If the locking tongue 24 is inserted in the belt buckle 22 and the belt buckle 22 is thus closed, the current absolute webbing extension corresponds to the sum of the minimum value and the proportion of the nominal value that corresponds to the absolute angle of rotation a measured.

As the rotation of the belt reel 28 is reduced, when the belt reel 28 is adjusted from the ghost position to the fully extended position, to an angle of rotation a of 350° of the second gear element 44, also the extension length of the webbing 18 in this range is reduced to an angle of rotation a of 350° of the second gear element 44.

Further, the mapping is linear so that a change of the webbing extension results in a corresponding change of the angle of rotation a over the whole range, i.e., from the ghost position to the fully extended position. If the nominal value is 700 mm, for example, the webbing extension in the present embodiment changes by 700 mm per 350°, that is, by 2 mm per 1°.

If, for example, the minimum value is 500 mm and the identified absolute angle of rotation a is 120°, the current absolute webbing extension in the present embodiment is 740 mm (=500 mm+120°×2 mm/°).

If, on the other hand, the locking tongue 24 is not inserted in the belt buckle 22, the extension length of the webbing 18 can be identified only relatively.

Accordingly, in an approximation, the current absolute webbing extension can be equated with the proportion of the nominal value that corresponds to the absolute angle of rotation a measured. That is, in contrast to the closed belt buckle 22, the minimum value is not added to the proportion of the nominal value to calculate the webbing extension when the belt buckle 22 is opened.

Further information for determining the webbing extension length more precisely can be, for example, the position of a belt height adjuster 50 (see FIG. 1) of the seat belt system 10, the seat position and the adjustment travel of a seat height adjuster 52 of the seat 12. This information is used, as far as it is currently available, as additional input parameters for determining the webbing extension length and helps increase the measuring accuracy of the webbing extension.

As described above, the reduction of the gear unit 36 is designed so that, when the belt buckle 22 is closed, the rotation of the belt reel 28 is always reduced, when the belt reel 28 is adjusted from the ghost position to the fully extended position, to a maximum of 1.0 revolutions of the measuring element 34. This ensures that the nominal value is always mapped to a maximum of one revolution of the measuring element 34, irrespective of other factors influencing the extension length of the webbing 18 in this range, such as the position of the belt height adjuster 50, the seat position and the adjustment travel of the seat height adjuster 52.

For an adjustable seat and/or seat belt, it is further advantageous when for each seat and/or seat belt position a respective minimum value and/or nominal value is stored in the storage unit 48 which is used to identify the current webbing extension so as to improve the accuracy of the identified extension length of the webbing 18.

Therefore, by the afore-described method and the seat belt system 10, the current absolute webbing extension length can be determined very precisely and permanently with little effort in terms of devices, in particular in the range between the fully extended position and the ghost position.

One reason for this is the lower reduction ratio and the small number of tooth profile changes which are required as compared to a system in which the whole belt reel revolutions from the minimum position to the fully extended position are reduced to one revolution of the measuring element 34 and are measured.

In combination with the belt buckle status, an absolute webbing extension signal is resulting even after undefined states, such as after power breakdown. In this way, in the range between the fully extended position and the ghost position an absolute extension length of the webbing 18 can be reliably identified at any time. The seat belt system 10 thus is a "true power on" system.

Moreover, existing seat belt system can be enhanced with little effort to form the afore-described seat belt system 10, as only few additional components are required when the existing gear unit is used.

Further advantages of the simple structure of the seat belt system 10 consist in the fact that it can be manufactured at particularly low cost and that it can have a particularly space-saving design.

The invention is not limited to the illustrated embodiment. In particular, individual features of one embodiment can be combined at will with features of other embodiments, in particular independently of the other features of the respective embodiments.

The invention claimed is:

1. A seat belt system comprising a control unit (14) and a seat belt (16) which includes a webbing (18) and a belt retractor (20), the belt retractor (20) including a belt reel (28) for the webbing (18), a rotation angle sensor (30) with a sensor unit (32) and a rotatable measuring element (34), and a gear unit (36) coupling the belt reel (28) to the measuring element (34) and comprising at least one gear element (42, 44), the belt reel (28) having a fully extended position and a ghost position, wherein the gear unit (36) is designed such that the gear unit (36) reduces the rotation of the belt reel (28), when the belt reel (28) is adjusted from the ghost position to the fully extended position, to a maximum of 1.0 revolutions of the measuring element (34), the rotation angle sensor being the only sensor used to determine an extension length of the webbing from the belt retractor.

2. The seat belt system according to claim 1, wherein the gear unit (36) reduces the rotation of the belt reel (28), when the belt reel (28) is adjusted from the ghost position to the fully extended position, to more than 0.9 revolutions of the measuring element (34).

3. The seat belt system according to claim 1, wherein the gear element (42, 44) is the measuring element (34), or in that the measuring element (34) is secured on the gear element (42, 44).

4. The seat belt system according to claim 1, wherein the belt reel (28) has a minimum extension position, wherein the gear unit (36) is designed such that the gear unit (36) reduces the rotation of the belt reel (28), when the belt reel (28) is adjusted from the minimum position to the fully extended position, to more than 1.0 revolutions and less than 2.0 revolutions of the measuring element (34).

5. The seat belt system according to claim 4, wherein the gear unit (36) reduces the rotation of the belt reel (28), when the belt reel (28) is adjusted from the minimum position to the fully extended position, to more than 1.05 revolutions of the measuring element (34).

6. The seat belt system according to claim 4, wherein the gear unit (36) reduces the rotation of the belt reel (28), when the belt reel (28) is adjusted from the minimum position to the fully extended position, to less than 1.5 revolutions of the measuring element (34).

7. The seat belt system according to claim 4, wherein the gear unit reduces the rotation of the belt reel, when the belt reel is adjusted from the minimum position to the fully extended position, to more than 1.10 revolutions of the measuring element.

8. The seat belt system according to claim 1, wherein the rotation angle sensor (30) is a magnetic sensor, an optical sensor and/or an induction-based sensor.

9. The seat belt system according to claim 1, wherein the gear unit (36) is a single-stage or multi-stage gear unit.

10. The seat belt system according to claim 1, wherein the seat belt system (10) includes a belt buckle (22) and a locking tongue (24) for the belt buckle (22) coupled to the webbing (18) the belt buckle (22) including a belt buckle sensor.

11. The seat belt system according to claim 1, wherein the gear unit reduces the rotation of the belt reel, when the belt reel is adjusted from the ghost position to the fully extended position, to more than 0.95 revolutions of the measuring element.

12. The seat belt system according to claim 1, wherein the extension length of the webbing from the belt retractor is based only on the measured angular position of the measuring element.

13. The seat belt system according to claim 1, wherein the control unit includes a storage unit in which a nominal value of webbing length is stored, the nominal value being a webbing length that is extended from the belt reel to adjust the belt reel from the ghost position to the fully extended position.

14. The seat belt system according to claim 13, wherein a minimum value of webbing length is stored in the storage unit, the minimum value being a webbing length that is extended from the belt reel to adjust the belt reel from a minimum position to the ghost position.

15. A method for determining the extension length of a webbing (18) of a seat belt system (10) wound on a rotatable belt reel (28), the belt reel (28) having a fully extended position and a ghost position,
   a) detecting whether a locking tongue (24) of the seat belt system (10) is inserted in the belt buckle (22) of the seat belt system (10),
   b) measuring, when the locking tongue (24) is inserted in the belt buckle (22), the angular position (a) of a measuring element (34) that is coupled to the belt reel (28) by means of a gear unit (36), the rotation of the belt reel (28) being reduced, when the belt reel (28) is adjusted from the ghost position to the fully extended position, by the gear unit (36) to a maximum of 1.0 revolutions of the measuring element (34), and
   c) determining the extension length of the webbing (18) based only on the measured angular position (a) of the measuring element.

16. The method according to claim 15, wherein the rotation of the belt reel (28) is reduced, when the belt reel (28) is adjusted from the ghost position to the fully extended position, to more than 0.9 revolutions of the measuring element (34).

17. The method according to claim 15, wherein the rotation of the belt reel is reduced, when the belt reel is adjusted from the ghost position to the fully extended position, to more than 0.95 revolutions of the measuring element.

* * * * *